United States Patent [19]

Coccolo

[11] Patent Number: 5,217,414
[45] Date of Patent: Jun. 8, 1993

[54] LINEAR VELOCITY CORRECTIVE DEVICE

[75] Inventor: Enzo Coccolo, Gorizia, Italy

[73] Assignee: Danieli & C. Officine Meccaniche SpA, Buttrio, Italy

[21] Appl. No.: 808,916

[22] Filed: Dec. 18, 1991

[30] Foreign Application Priority Data

Dec. 20, 1990 [IT] Italy ................ 83550 A/90

[51] Int. Cl.[5] ........................... F16H 55/12
[52] U.S. Cl. ................... 474/160; 474/162; 474/164
[58] Field of Search ........... 474/152, 160, 162, 164; 101/DIG. 48; 144/242 D; 198/834; 180/343

[56] References Cited

U.S. PATENT DOCUMENTS

| | | | |
|---|---|---|---|
| 638,790 | 12/1899 | Wunderlich | 474/164 X |
| 2,038,695 | 4/1936 | Wilmot | 198/834 |
| 2,101,172 | 12/1937 | Gegenheimer | 74/240 |
| 3,311,220 | 5/1967 | Ianson | 474/162 X |
| 3,983,762 | 10/1976 | Dellner | 198/834 X |
| 4,059,022 | 11/1977 | Fawcett et al. | 474/131 |
| 4,498,890 | 2/1985 | Sutherland | 474/140 |
| 4,538,516 | 9/1985 | Aaron | 474/158 X |

FOREIGN PATENT DOCUMENTS

| | | | |
|---|---|---|---|
| 61-171942 | 8/1986 | Japan . | |
| 164437 | 8/1958 | Sweden | 474/163 |
| 166220 | 5/1919 | United Kingdom . | |
| 437238 | 4/1934 | United Kingdom . | |

Primary Examiner—Thuy M. Bui
Assistant Examiner—Roger J. Schoeppel
Attorney, Agent, or Firm—Antonelli, Terry, Stout & Kraus

[57] ABSTRACT

Linear velocity corrective device for chains (11) driven by toothed wheels (14), advantageously toothed wheels (14) with few teeth, for closed looped chains (11) extending in a plane or subvertical, operating near the joining zone of said chain (11) with said toothed wheel (14) and comprising levelling means (16-26-28) for the levelling of the links (12) according to the tangent to the circumference created by the pitch diameter (DP) of said toothed wheel (14) and operating upstream of the vertical of the rotation axis (15) of said toothed wheel (14).

9 Claims, 2 Drawing Sheets

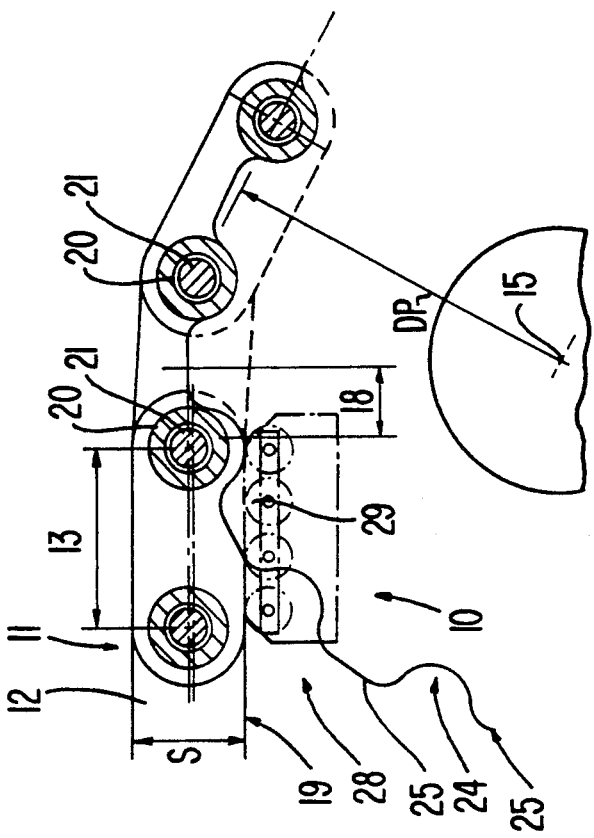
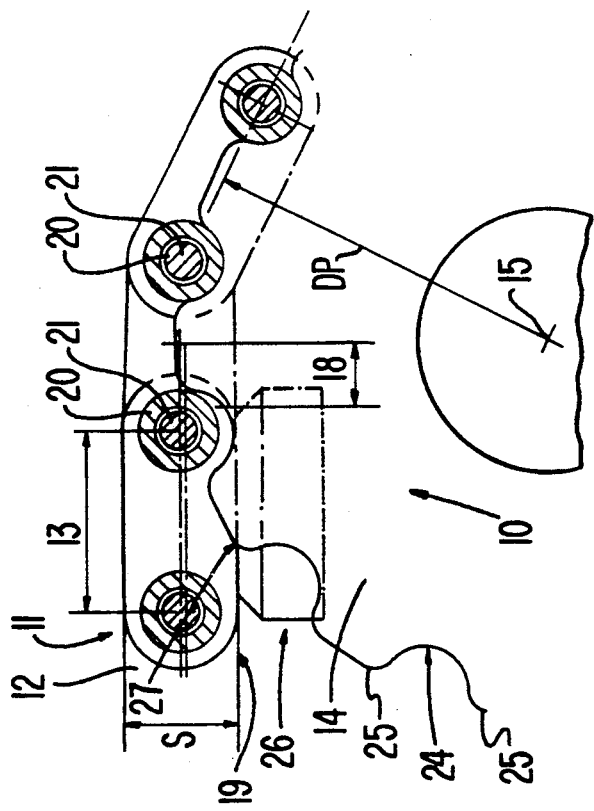
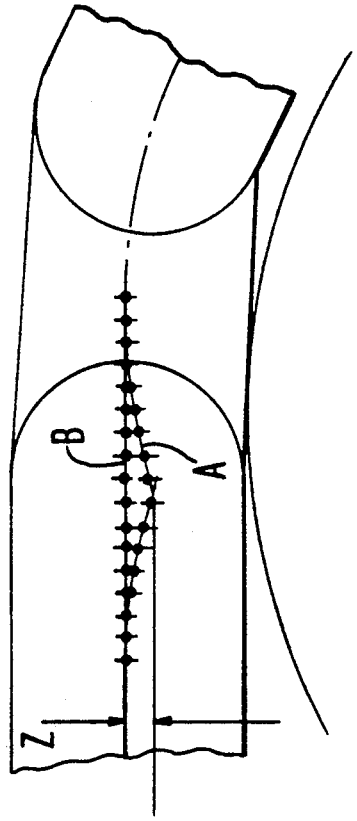

LINEAR VELOCITY CORRECTIVE DEVICE

The present invention relates to a linear velocity corrective device with improved joining of the chain with the driving wheel, as set forth in the main claim.

The present invention finds the correct application in all those cases in which it is necessary to correct the linear velocity of chains, or of elements connected thereto, which advance in a horizontal or inclined plane, drawn by toothed wheels, normally toothed wheels with few teeth, and in which the chains are, at least periodically, suspended in the portion upstream of the drawing toothed wheel.

It is known that the chains, having a certain inside length for the link, which are drawn in an horizontal or inclined plane remaining suspended at least for a portion upstream of the drawing toothed wheel, in the case of drawing toothed wheels having few teeth, they advance at a velocity having an arc or bouncing advancement, each are or bounce substantially corresponding to the cooperation with one tooth of the drawing toothed wheel.

For those chains the velocity of movement goes from a minimum to maximum and then returns to the minimum because, due to the weight force of the chain which acts on the toothed wheel and near it, the chain tends to go up and down upon the passage or not of the drawing tooth.

The minimum velocity conditions are realized when the toothed wheel is in a position in which two teeth are equally spaced from the upper vertical, in those cases where in which the drawing is applied on the upper side of the chain loop intended as extending on a substantially horizontal plane.

The maximum velocity condition substantially corresponds to the connection of one tooth with the vertical, for those cases where the drawing is applied on the upper side of the chain loop intended as extending substantially horizontally.

The description that follows, for the simplicity of disclosure, will take into consideration only the condition of a chain loop extending horizontally, therewith extending is also included any condition of inclined catenary in which the weight force bends the links of the chain towards the drawing toothed wheel in the portion upstream of said drawing toothed wheel.

This "bouncing" advancement depends upon the continuous shift from a minimum diameter (minimum velocity) to the nominal diameter of drawing (maximum velocity) and vice versa of the chain being drawn with respect to the rotation axis of the drawing toothed wheel. This "bouncing" course becomes more troublesome when operations must be effected at a constant or substantially constant velocity.

Additionally, the considerable acceleration and braking forces acting on the chain, besides requiring considerable absorption and dispertion power, cause a relevant amount of stress on the chain.

It is sufficient to think about those chains having a weight of 150 to 250 kg per linear meter and forming closed loops extending for thirty or more meters. Such is the case, for instance, of the chains for the drawing benches of drawing machines, in which the weight force of the links is noticeably felt between the long holding mobile bench and the toothed wheel, for instance a drawing toothed wheel.

It all becomes even more evident in those cases in which the chains, due to their construction, are held in suspension, only on one or at most two intermediate supports, between the head toothed wheel and the tail toothed wheel. In those cases, not only is the power noticeably wasted due to the fact that it can reach values up to 8 to 10%, but the stresses induced are noticeably high and cause considerable deformities and wear, requiring the oversizing of the links and connections.

In order to obviate such drawbacks attempts were made, whereby, on one hand, the inside link of the chains was reduced, and on the other, the diameter of the drawing toothed wheel was increased.

This condition, however, in many practical cases is unattainable and, therefore, one must make due with this "bouncing" velocity with the consequent limitation of the maximum velocity obtainable with the system.

The present applicant has therefore set the objective goal of resolving in a simple and cost effective way this problem, so that the present solutions can be easily applied not only to the new embodiments, but to the existing ones as well.

The invention is set forth and characterized in the main claim, while the dependent claims describe variants of the idea of the original solution.

It is, therefore, the purpose of the present invention to improve the join of the chains with the drawing toothed wheel also when normally supported.

According to the invention, in cooperation with the drawing toothed wheel and with the position of maximum diameter, a support slipper is arranged which substantially reaches up to 0.3 to 0.5 times the inside length of the chain from the vertical passing through the rotation axis of the toothed wheel and upstream thereof. This slipper cooperates either with elements external to the chain but integral with the elements thereof, or with the links of the chain, supporting the chain substantially on a plane in which the longitudinal axis passing through the axis of the links passes tangent to the circumference created by the pitch diameter of the drawing toothed wheel.

According to a variant, at least one idle wheel is provided which is placed with the axis on a parallel vertical plane and upstream of the vertical plane containing the rotation axis of the drawing toothed wheel, said wheel cooperating, for example, with the links of the chain. Said two vertical planes are spaced apart 0.3 to 0.6 times the span of the link, advantageously about 0.4 times.

According to another variant, a roller table having wheels with small diameter reaching up to 0.3 to 0.6 times the span of the link, advantageously 0.4 times, is provided.

The attached figures give a non-restrictive example of the embodiment of the invention as follows:

FIG. 3 shows a variant of FIG. 1;

FIG. 4 shows another variant of FIG. 1;

FIG. 5 shows the advancement of the chain.

Figure 2:
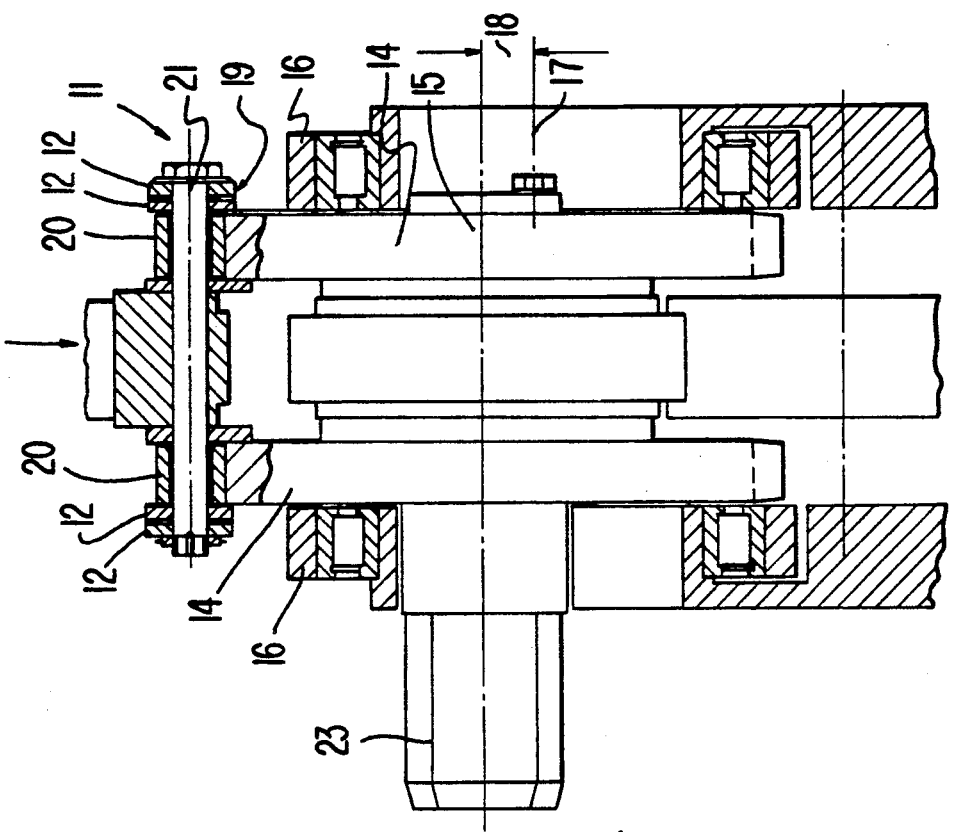
FIG. 2 shows a horizontal section according to line A-A of FIG. 1.

With reference to the Figures, the chain 11 comprises links 12 with an inside length 13 and is drawn by a toothed wheel 14 with a rotation axis 15.

Figure 1:
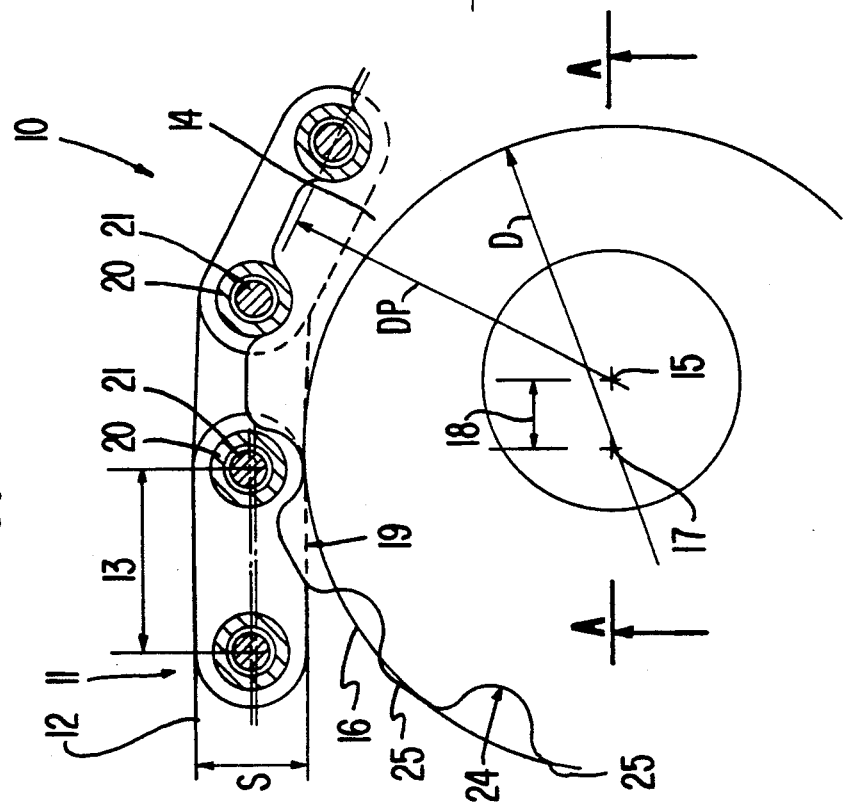
FIG. 1 shows a side view of an embodiment according to the invention applied to a drawing chain for drawing machines.

FIG. 1 illustrates the toothed wheel 14 with a tooth substantially positioned on the vertical of the rotation axis 15.

FIG. 1 also illustrates a chain 11 which extends on a horizontal plane on a closed loop around the head and tail toothed wheels. The shown chain 11 is a drawing chain for a drawing machine and can extend even for 30 or more meters. The chain 11 comprises side links 12 which carry a pin 21 on which the idle rollers 20 are mounted.

Between the idle rollers 20 there is the draw system 22 of the drawing machine. The idle rollers 20 cooperate with the two toothed wheels 14 rotated by shaft 23 in a known manner. The idle rollers 20 cooperate with spaces 24 present between the teeth 25 of the toothed wheel 14.

All this is well known and present in the art.

The chain 11 can be suspended in the air between one toothed wheel and the other, or it can comprise intermediate supports which cooperate with rollers 20. Said intermediate supports extend until they cooperate with the periphery of the toothed wheel 14, leaving, however, an open space which allows the chain to lower itself when the vertical, for example, coincides with the space between two teeth. This lowering, during the joining of the following tooth, causes an acceleration thrust.

On a wheel 14 having thirteen teeth 25 and a pitch diameter of 334.287 mm, the shift in velocity goes from a minimum of 97.1% to a maximum of 100% and again to the minimum value, and so forth, for each link/tooth.

In this example, with a nominal velocity of 200 mm per minute, the velocity goes from 195.2 m per minute to 200 m per minute, and then returns to 192.2 m per minute, and so forth, with a frequency of 41.667 Hz.

It can therefore be seen that, not only is there an appreciable shift in velocity, but that such a shift occurs with a frequency such that the chain could also go into resonance and give rise to the related problems.

The purpose of the invention is therefore to improve the join of the chain 12 with the toothed wheel 14 so that said shift in velocity, due to a temporary lowering of the end portion of a link 12, will not cause unbalances within the chain itself.

According to the solution of FIG. 1, two idle wheels 16 are provided which have a rotation axis 17 parallel to the rotation axis 15 of the toothed wheel 14, but off-centered at 18 with respect to said rotation axis 15. The off-centering 18 is located upstream of the rotation axis 15. The idle wheels 16 are in this case placed at both sides of the toothed wheel 14 and cooperate with the lower portion 19 of the links 12 when the links 12 are stretched on the pitch diameter of the wheel 14. In other words, if the axis 17 of the idle wheel 16 is at the same hight as the axis 15 of the toothed wheel 14, the diameter of the idle wheel 16 is derived by the formula $$DP-S$$

where DP is the pitch diameter of the toothed wheel 16, and S is the hight of the link 12.

It is obvious that the axis 17, can also be located at a different hight, thereby obtaining a smaller diameter D for the idle wheel 16.

The off-centering 18 is 0.3 to 0.6 time the inside length 13. In this case, the off-centering 18 is 0.37 times the inside length 13 of the link 12, thereby the chain 11 is always supported, even when there is a space 24 in the vertical and the oscillation of the lowering movement is reduced to infinitesimal values which, in fact, are not even felt as shifts in velocity.

According to a variant, the idle wheels 16 can be mounted in such a way that their axis 17 is inclined at a certain angle to the axis of the idle rollers 20.

In a variant shown by FIG. 3, slippers 26 are provided which cooperate with the lower portion 19 of the links 12 and upstream of the rotation axis 15.

The slipper 26 comprises a cooperating portion 27 which substantially ends at a distance 18 which corresponds to that of FIG. 1.

Also the upper plane 27 corresponds to the peak of the idle wheel 16.

FIG. 4 shows a further variant. In this case, instead of slippers 26 small rollers 29 are provided forming a group 28 and cooperating with the lower portion 19 of the links 12.

FIG. 5 shows, step by step, the advancement of the axis of a normal pin 21 of the chain 11 near the join.

In said FIG. 5 a first curve "A" can be seen, which corresponds to the case of systems known in the prior art, where the intermediate supports extend until they cooperate with the periphery of the toothed wheel 14.

Additionally, in said FIG. 5 a second curve "B" can be seen which represents the case in which the invention is mounted according to the solutions shown in FIG. 1.

Said FIG. 5 shows the velocity shift "Z" as occurs in the known art, such velocity shift decreases to infinitesimal values in the case in which one of the levelling means 16-26-28 is mounted according to the invention.

As it can be seen, the invention 10 is intended for the join of the chains 11 with the drawing toothed wheel 14.

Thus, the invention 10 operates merely and only near the joining zone and, in said zone, it serves to maintain the chain 11 substantially in axis with the rest of the chain 11, which, in fact, lies on the tangent to the circumference created by the pitch diameter DP.

I claim:

1. Linear velocity corrective device for chains (11) driven by toothed wheels (14), advantageously toothed wheels (14) with few teeth, for closed looped chains (11) extending in a plane or subvertical, characterized in that it operates near the joining zone of said chain (11) with said toothed wheel (14) and comprises levelling means (16-26-28) for the levelling of the links (12) according to the tangent to the circumference created by the pitch diameter (DP) of said toothed wheel (14) and operating upstream of the vertical of the rotation axis (15) of said toothed wheel (14).

2. Linear velocity corrective device as claimed in claim 1, characterized in that the levelling means (16-26-28) cooperate with the lower portion (19) of the links (12).

3. Linear velocity corrective device as claimed in claim 1, characterized in that the levelling means (16-26-28) cooperate with the auxiliary means to the links (12).

4. Linear velocity corrective device as claimed in any of the above claims up to 2 inclusive, characterized in that the levelling means are of the slipper (26) type.

5. Linear velocity corrective device as claimed in any of the above claims up to 2 inclusive, characterized in that the levelling means are of the idle wheel (16) type.

6. Linear velocity corrective device as claimed in any of the above claims up to 2 inclusive, characterized in that the levelling means are of the idle wheel (16) type with the axis (17) parallel to the rotation axis (15) of the toothed wheel (14).

7. Linear velocity corrective device as claimed in any of the above claims up to 2 inclusive, characterized in that the levelling means are of the idle wheel (16) type with the axis (17) inclined at a certain angle to the axis of the idle rollers (20).

8. Linear velocity corrective device as claimed in any of the above claims up to 2 inclusive, characterized in that the levelling means are of the idle rollers (28) type.

9. Linear velocity corrective device as claimed in any claim hereinbefore, characterized in that the last contact point between the levelling means (16-26-28) and the chain (11), when a tooth (25) is in the vertical of the rotation axis (15), is off-centered (18) upstream of said vertical 0.3 to 0.6 times the inside length (13) of the chain (11).

* * * * *